Jan. 9, 1962

L. D. HARMON 3,016,421

ELECTROGRAPHIC TRANSMITTER

Filed Nov. 30, 1960

INVENTOR
L. D. HARMON
BY
C. E. Hirsch Jr.
ATTORNEY

United States Patent Office 3,016,421

Patented Jan. 9, 1962

3,016,421

ELECTROGRAPHIC TRANSMITTER

Leon D. Harmon, Warren Township, Somerset County N.J., assignor to Bell Telephone Laboratories, Incorporated, New York, N.Y., a corporation of New York Filed Nov. 30, 1960, Ser. No. 72,605
17 Claims. (Cl. 178—19)

This invention relates to the conversion of graphic material into electrical signals. More particularly, it relates to an electrographic signal generator for instantaneously converting cursive writing or the like produced by a stylus operating on a surface of the generator into electrical signals. It has for its principal objects the production of an electrical signal representing the location of the stylus at any instant, the avoidance of all encumbrances, either electrical or mechanical, of the stylus used with the generator, and the simultaneous procurement of a permanent record of the graphic material as it is written.

A great variety of electrographic transducers known variously as telewriter generators and telautographic transmitters, are available for converting printed or cursive writing, or other graphic material into electrical signals. Apparatus of this sort has been used in the past in terminal equipment of private communication systems and, more recently, to supply electrical signal counterparts of written human language to automatic character or pattern recognition apparatus that converts written human language into what has been termed "machine language." The basic transducer requirements are essentially the same for both applications. Yet in prior art devices, where it has not usually been possible to meet all basic requirements simultaneously, emphasis has shifted in various equipments from a predominant fulfillment of one requirement to an attempt to fulfill one or more of the others.

Perhaps the most important requirement is that the conversion from one form of intelligence to another be a faithful one; one without excessive distortion. Distortion arises not only from the mechanical and electrical intricacies of the apparatus, but also often as a result of the manner by which the writing instrument or stylus is encumbered, as by an electrical conductor coupling it to the apparatus or by rather involved mechanical linkages supporting it, such as pantographs and the like. So long as a captive stylus of any sort is required, the exercise of a natural writing style is hindered and an operator must adapt his writing manner to that of the device. Even if electrical conversion linearity is insured, a captive stylus reduces the faithfulness of the transcription. A stylus free of all restraint clearly is preferable.

A further requirement is that a permanent record be made concurrent with the writing operation. Mechanical telautographs traditionally provide a record, but most free-stylus apparatus does not. Although free-stylus devices are known that use, for example, a cathode ray tube face or a resistive sheet as a writing surface, only with auxiliary equipment can a permanent record be made.

All of these requirements are met in the present invention. A faithful translation is made from graphic to electrical form; advantageously, cursive writing is represented as a succession of quantized X—Y addresses manifestly suitable for either communication to a distant station or for analysis by automatic character recognition apparatus. Any pen or pencil may be used, without restraint, as a stylus to create a permanent written record on ordinary writing paper concurrent with the conversion of stylus motions into electrical signals proportional to the instantaneous coordinates of stylus position. Furthermore, the writing surface is clear of electromechanical guide elements and the like, and is insensitive to electrostatic and electromagnetic influences that often disturb telewriters that rely on electric and magnetic fields.

In accordance with the present invention, an electrographic transmitter comprises a writing surface, suitable for supporting a sheet of ordinary writing paper, above which a number of flat focused beams of light are directed in at least two nonparallel directions over the surface. A plurality of photosensitive elements are positioned along the edges of the writing surface to capture the foscused light beams. Individual elements are coupled by means of suitable amplifiers to output registers. As the individual focused beams of light are interrupted by the shadow of any form of opaque stylus point used for entering written material on the writing surface, signals are produced in the photocell circuits. Pairs of such signals specify the instantaneous quantized X—Y address of the stylus tip on the writing surface. These data, which represent uniquie indicia of the coordinates of position of the stylus, are supplied to the registers and held until gested by suitable utilization apparatus.

The focused beams of light may be produced in various ways. For example, simple prefocused sources of light such as miniature light bulbs or the like, may be directed by way of prisms or mirrors to provide fan-shaped flat beams of light that extend over the writing surface. Preferably, however, collimating apparatus is employed to direct substantially parallel beams of light over the surface. Somewhat higher resolution is obtainable with collimating apparatus than with the simplified light source described above, but at the expense of apparatus complexity.

For certain applications, involving automatic character recognition apparatus for example, cursive material must be written with a specified relation to known reference locations. Reference indicia is provided conveniently in the present invention by optically projecting them onto the writing surface. In a preferred embodiment of the invention, a pair of guide lines corresponding to the reference lines on a ruled sheet of writing paper are created by illuminating from below a pair of narrow windows in the writing surface of the telewriter generator surface. The illuminated slits are clearly visible through ordinary writing paper yet the surface retains its smooth uncluttered appearance. Additionally it is often desirable to obtain an electrical indication of stylus contact with the writing surface in order to establish the start and completion of meaningful stylus motions. Also some character recognition programs require an electrical signal to aid in the segmentation of a cursively written word into discrete alphabetic letters and to identify dot and slash marks. Signals of this sort, variously called stylus-down signals or Z axis signals, are conveniently obtained from the pen or pencil used as a stylus in the present invention by detecting vibrations of the writing surface that accompany writing. Alternatively, Z axis signals may be produced by establishing an auxiliary optical or electrostatic field and noting the change in field intensity that results from the presence of a stylus in close proximity to the writing surface.

The invention will be fully apprehended from the following detailed description of illustrative embodiments thereof taken in connection with the appended drawings, in which.

Figure 1:
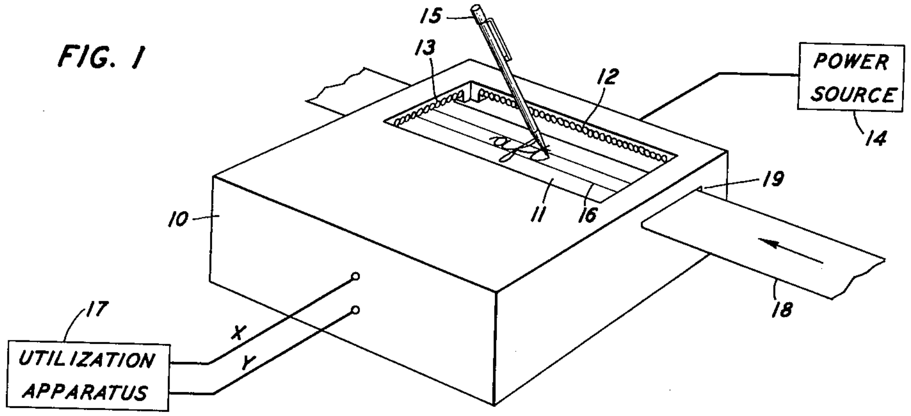
FIG. 1 is a simplified diagrammatic representation of an electrographic transmitter in accordance with the present invention.

Referring now to FIG. 1, there is shown an electrographic signal generator which includes a base member 10 for supporting a writing surface 11. Writing surface 11 is ordinarily placed in a recessed area so that the optical system of the transducer may be fully encased by the base 10. The optical system includes apparatus for directing a pair of light fields, preferably in the form of relatively flat sheets, just above and across the writing surface in two coordinate directions. They impinge, respectively, two arrays of photosensitive elements 12 and 13 positioned along two edges of the surface in the path of the fields. Although not evident in FIG. 1, the light fields emanate from optical means located in the base 10 and are directed from the edges of the recessed area toward the photocell arrays. Collimated rays of light are preferred although other flat sheets may also be used in certain situations. Electrical power for energizing the light sources is supplied to the transducer from source 14.

An ordinary pen or pencil 15 is used to write on the surface 11 observing any guide line restrictions 16 required by the manner in which derived signal information is to be used. It will be recognized that the absolute freedom of all electrical and mechanical restraints of the writing instrument permits a natural writing style to be exercised. As the stylus 15 is used to write on the surface 11, interruptions of the orthogonal light fields by the stylus are detected by the individual photocells in each array that are momentarily shadowed. The instantaneous location of the stylus tip is thus established, for example, in terms of X—Y coordinates, by a pair of photocell signals. The $x$—$y$ signals are supplied to utilization apparatus 17 which typically includes processing equipment for adapting the signals for use in automatic character recognition apparatus or other computer applications. Alternatively, the utilization apparatus may include terminal equipment for transforming the signals into a form suitable for transmission to a distant station.

If a permanent record of the writing entered on the surface 11 is desired, ordinary writing paper may be placed on the surface. Conveniently, a sheet of paper 18 is drawn from a roll or the like and passed through a slot 19 that extends through the base 10 to cover the writing area. Once a message is complete, the paper is pulled through the slot to renew the writing surface; the used portion may be preserved as a permanent record.

Figures 2, 3:
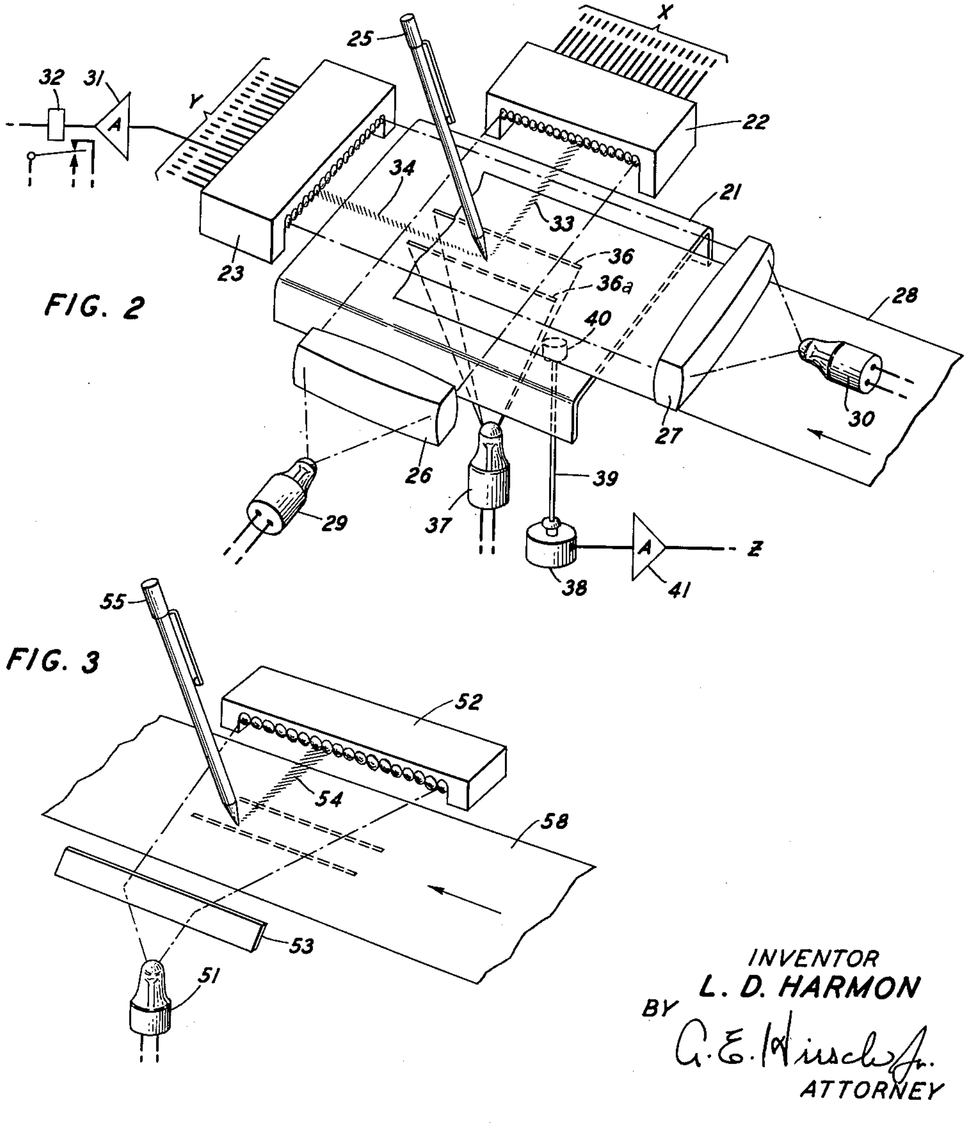
FIG. 2 is a perspective view of an electrographic transmitter that illustrates the principles of the invention.
FIG. 3 is a simplified perspective view of an alternative form of optical system suitable for use in the practice of the invention.

FIG. 2 illustrates, by way of simplified schematic view, the internal construction of a preferred form of electrographic transducer that embodies the principles of the invention. Two arrays of photosensitive devices 22 and 23, each comprising, for example, a plurality of miniature photocells closely spaced in a row and supported in a suitable housing, or a row of printed-circuit photocells, are positioned along two coordinate edges of a writing surface 21. Collimated rays of light are directed toward the photocells from the opposing edges of the surface. Any well known collimating means may, of course, be employed for establishing the crossed light fields above the surface. For example, thin sections of convex lenses 26 and 27 may be used for obtaining substantially parallel rays of light from a corresponding pair of light sources, e.g., miniature bulbs 29 and 30. By using a narrow section of a lens only, a relatively flat sheet of light is obtained. The same result may be achieved by placing an opaque mask with a narrow slit in front of a lens or prism.

Adjustment of the optical system is made to direct the collimated light fields along and just above the writing surface. By restricting the light fields to substantially flat sheets above the writing surface and making them of sufficiently high intensity, ambient room illumination has virtually no effect on the photocells, i.e., the primary energization for the cells is provided by the respective collimated light field. Shadows resulting from random room illumination falling on the stylus are therefore not sufficiently deep to overcome the biasing effect of the primary light fields. Preferably, the fields traverse the surface in a plane substantially parallel to the surface at an elevation of not more than one-tenth of an inch. This provides adequate clearance for minute irregularities of the writing surface occasioned, for example, by an improperly placed sheet of writing paper. Suitable spring means (not shown) in the housing 10 of FIG. 1 may be employed, if desired, to maintain the writing paper in a taut condition.

Any number of individual photocells may be used in each edge array dependent on the area of the writing surface used and the diameter of the individual cells. In practice, miniature cells whose diameters are each approximately one-tenth of an inch have been found to be satisfatcory. Printed-circuit photocells constructed, for example, in the fashion described in an application of L. D. Harmon and C. F. Mattke, Serial No. 781,627, filed December 19, 1958 permit somewhat tighter spacing of individual cells.

As the light fields are interrupted by the shadow of the stylus, as a message is written on the writing area, successive pairs of photocells are cut off from their normally energized condition. The change of state of a photocell constitutes an output signal which may be used in any desired manner. Typically, the output signal derived from each one of the individual cells is amplified, for example, in amplifier 31 and used to actuate a relay 32. An individual amplifier and relay (not shown) is provided for each photocell in both the X and Y arrays. As the stylus 25 is moved over the surface 21, the different pairs of photocells that are activated indicate the momentary position of the stylus. Sequences of such pairs represent, in prequantized form, the path followed by the stylus. Quantization of the address information is provided by the discrete photocell receptors; quantization granularity is a function of photocell diameter and spacing.

Shadows 33 and 34, thrown by the stylus, are not completely sharp as a result of diffraction and because in any practical system, the light beams are not completely parallel. Consequently, there are three possible response of photocells to a shadow cast by a stylus point, depending upon the shadow umbra and penumbra diameters, photocell diameters, photocell spacing, and amplifier-relay threshold settings. The first involves reasonably parallel beams of light incident on the stylus. For this condition, the shadowing of photocells may be such that, as the stylus is moved in a direction parallel to a line of photocells, one cell and its corresponding relay only are energized and de-energized before the adjacent cell is energized. Thus, there is a clean gap of no operation between successive quantized positions of the stylus. At the other extreme, the second condition, more than one photocell may be simultaneously energized. For example, as the stylus is moved from a position A to a position B, photocell A does not become de-energized until after photocell B has become energized. Consequently, two channels are simultaneously energized. The third possibility is such that photocell A drops out just as photocell B becomes energized thus leaving no gaps in quantized position and no overlaps.

The first alternative is the most practical one and is adequate for those systems in which it is required simply to know the relative stylus positions in time, for example, as a vector direction along one coordinate. In the second case, sufficient logical circuit apparatus responsive to the condition of the various photocell relays is required to compensate for the fact that two channels may be simulttaneously energized; a time sequential circuit is required that can recognize that A is energized first. Thus, as a new signal B is produced, the previously developed signal A may be simultaneously ignored. The delicacy of adjustment and parameter precision required in the third alternative to insure that sequentially operated channels precisely abut each other in time without overlap or dead space are such as to make this alternative considerably less practical than either of the former ones.

The quantized X and Y address information derived from the transducer may be used in a number of ways. It may, for example, be transmitted to a remote station and there employed to produce, via a telewriter of any well known design, a replica of the original message. If two transducers are employed together with two receivers, a two-way written conversation may be carried on. Each subscriber may visually observe his own written message and retain a copy of it while observing the incoming message on the receiver. An ordinary multiplex communication channel may be used to interconnect the two (or more) stations. Although quantization somewhat distorts the reproduction of the written material, with fine photocell spacing this is only a minor factor.

In practice, the telewriter generator is employed to transfer written cursive script into quantized X–Y address information for use in fully automatic character recognition apparatus specifically of the type described in L. D. Harmon patent application Serial No. 33,015, filed May 31, 1960. As fully developed in application Serial No. 33,015, a cursively written word in the English language is analyzed in terms of the vertical (Y direction) extensions of individual alphabetic characters above and below a pair of guide lines. Typically, small alphabetic letters such as *a*, *c*, and *e* are written to be enclosed completely within a pair of guide lines, whereas such letters as *b*, *l*, and *t* are written to occupy both the area between the guide lines and the area above the upper guide line. Similarly, letters such as *g*, *z*, and *y* are written to occupy the central guide line area and the area below the lower guide line. In addition, information regarding gaps between words, slash marks (as in *t*) and dots (as in *i* and *j*), is detected and utilized in the ultimate recognition of the written letter or word. The various elements described above are specified in terms of the instantaneous position of a stylus in writing a message; that is, in terms of the time sequence of quantized X and Y coordinate information derived as a message is written. It is evident that the signal information obtained from the photocell relays (e.g., 32) of the apparatus of the present invention provides the necessary information for this analysis.

The guide lines necessary for the analysis referred to above may be printed on the writing paper 28, and are satisfactory so long as the paper is always maintained in accurate alignment with the photocell arrays 22 and 23; i.e., with the surface 21. Preferably, however, guide lines fixedly associated with the surface 21 are employed so that the exact position of the writing paper used is not a critical factor. Accordingly, in the present invention guide lines are produced by means of a pair of narrow windows 36 in the writing surface 21 extending in the X coordinate direction. The windows, typically one-fiftieth of an inch wide, may be formed by filling narrow slots in the writing surface with a translucent plastic filler or the like to provide a firm writing surface. Alternatively, the writing surface 21 may be formed of a translucent material and opaquely masked leaving two narrow windows extending in the X direction. The windows are illuminated by means of an optical system including a light source 37 and a suitable lens and masking element (not shown). With sufficient illumination, the lighted windows are clearly visible through ordinary writing paper and provide the necessary guide lines for restricting cursive script to the required areas of the writing surface. The spacing of the windows 36, in terms of photocell diameter and number, is a constant and is utilized as a parameter of the character recognition program.

Segmentation gaps, dots and slash information is detected in the aforementioned character recognition apparatus by noting the momentary disengagement of the stylus from the writing surface. Such information typically is referred to as a stylus up-down information or, simply, Z axis information. One convenient way of obtaining the Z axis information is illustrated in FIG. 2. A pressure sensitive transducer 38, for example, a carbon-granule transmitter element, is coupled to the writing surface 21 by means of a shaft 39 and a boss 40 attached to the surface 21. As the stylus 25 engages the writing surface 21, the pressure variation resulting from the contact is transmitted through the shaft 39 to transducer 38, and, by way of an amplifier 41, to a relay or other suitable receptor. With sufficiently high gain, a threshold in amplifier 41 may be established such that stylus contact with the writing surface is detected. Transducer 38 must, of course, be mounted independently from, and not coupled to, the housing or the writing surface 21. A form of shock mounting or the like may be used for this purpose.

Alternatively, Z axis information may be derived by forming the crossed light fields (from lenses 26 and 27) with sufficient precision that they do not extend more than, for example, one-sixteenth of an inch above the writing surface. Consequently, as any photocell in either array of cells 22 or 23 is energized, it may be assumed that the stylus is in or very close to a writing position. By a suitable logic circuit the Z axis information may accordingly be registered.

FIG. 3 illustrates a somewhat simplified optical system suitable for use in those cases in which a relatively small writing area is sufficient. Light emanating from a miniature light bulb 51 is reflected by means of a relatively narrow plane mirror 53 onto the photocells in the array 52. The narrow dimension of the reflecting surface is selected such that with proper positioning between the light source and the photocell receptors, the depth of the focused light field is relatively small, e.g., the narrow dimension of the reflecting surface may be on the order of one-sixteenth of an inch. The longer dimension of the reflecting surface is made sufficiently long to provide full reflectance of light over the entire writing surface, i.e., to direct the light field to all of the photo receptors on the opposite side of the writing area. The resulting field is not truly rectangular but instead is somewhat trapezoidal. However, the departure from a rectangular field is not great in the useful writing area and with sufficiently small photocell elements it is adequate for many applications. If required, a mask with a narrow slit may be positioned between a somewhat larger mirror and the photocell array 52 to insure a relatively thin sheet of light across the writing surface. As in the case of the narrow mirror, the width of the slit is made relatively small, e.g., on the order of one-sixteenth of an inch.

The above-described arrangements are, of course, merely illustrative of the application of the principles of the invention. Numerous other arrangements may be devised by those skilled in the art without departing from the spirit and scope of the invention.

What is claimed is:

1. An electrographic transmitter that comprises, a writing surface, a plurality of photosensitive elements positioned to capture, respectively, light projected across said surface substantially parallel to said writing surface from two nonparallel directions, and means responsive to signals generated by said photosensitive elements for indicating, respectively, shadowing of said light by an opaque element.

2. An electrographic transmitter that comprises, a writing surface, means for projecting light over said surface in a plane substantially parallel to said surface and located a small distance thereabove, a plurality of photosensitive elements positioned normally to capture light projected in said plane after its passage over said writing surface, and means for identifying individual ones of said photocells that are shadowed from said light by an opaque element.

3. An electrographic transmitter that comprises, a writing surface, means for projecting light in at least two different directions over said surface in a plane substantially parallel to said surface and located a small distance thereabove, a plurality of photosensitive elements positioned normally to capture light projected in both directions in said plane after its passage over said writing surface, and means for identifying individual ones of said photocells that are shadowed from said light emanting from both of said directions by an opaque element.

4. An electrographic transmitter that comprises, a writing surface, means for directing flat focused beams of light over said surface in at least two nonparallel directions, a plurality of photosensitive elements positioned along the edges of said writing surface in the paths of said beams, each of said elements being energized by selected ones of said beams, and means responsive to the signals generated by said photosensitive elements for indicating, respectively, an interruption of said light beams by an opaque writing element.

5. Electrographic transmitter apparatus that comprises a surface for supporting a writing medium, means for directing at least two flat focused beams of light over said surface in nonparallel directions, a plurality of photosensitive elements positioned in contiguous alignment along the edges of said writing surface in the paths of said beams, an amplifier associated with each one of said plurality of photosensitive elements for producing an output signal indicative of the degree of incident illumination of said associated elements, and means responsive to said signals for indicating an interruption of said light beams by an opaque writing element.

6. Electrographic transmitter apparatus as defined in claim 5 wherein said means for directing said flat focused beams of light over said surface comprises, for each of said focused beams of light, a miniature light source, and a narrow reflecting surface extending along one edge of said writing surface between said light source and the photosensitive elements positioned along the opposite edge of said writing surface.

7. Electrographic transmitter apparatus as defined in claim 5 wherein said means for directing said flat focused beams of light over said surface comprises, for each of said focused beams of light, a miniature light source, and an opaque mask with a narrow slit extending in the direction of the plane of said writing surface between said light source and the photosensitive elements positioned along the opposite edge of said writing surface.

8. Apparatus as defined in claim 5 wherein said means for indicating an interruption of said light beams comprises a switching circuit associated with each one of said amplifiers adjusted to be energized only for detected interruptions of one of said light beams by a corresponding photosensitive element.

9. Electrographic transmitter apparatus that comprises, a writing surface, a pair of light sources, first collimating means for directing substantially parallel beams of light over said surface in a first direction, second collimating means for directing substantially parallel beams of light over said surface in a second direction, said first and said second directions being substantially perpendicular to one another in a plane substantially parallel to said writing surface, a plurality of photosensitive elements positioned along edges of said writing surface in the paths of said beams in both of said directions, each one of said photosensitive elements being adjusted to produce a potential of a first magnitude when illuminated by a light of an intensity below a threshold level of intensity, and to produce a potential of a second magnitude when illuminated by light of an intensity above said threshold level, amplifier means associated with each one of said plurality of photosensitive elements, and means responsive to said amplified signals for indicating, respectively, an interruption of said light beams by an opaque writing element.

10. Apparatus as defined in claim 9 wherein both said first and said second collimating means comprise a thin section of a convex lens positioned between one of said light sources and the plurality of photocells positioned along the opposite edge of said writing surface.

11. Apparatus for transforming cursive writing into a quantized electrical representation of successive X and Y coordinate positions of a writing instrument on a writing surface, comprising in combination, a writing surface, a writing instrument free of all electrical and mechanical restraints, means for optically detecting the presence of said writing instrument on said surface, said means including means for establishing the instantaneous location of said writing instrument with regard to said writing surface in terms of selected incremental locations in each of two orthogonal coordinate directions, and means for supplying said incremental location data to automatic processing apparatus.

12. Electrographic transmitter apparatus for developing electrical signals proportional to the coordinates of position of a writing instrument as it is moved by an operator over a writing surface, comprising, a writing surface, a writing instrument, means for separating said writing surface into visually distinctive regions extending longitudinally in said surface, an array of photosensitive elements juxtaposed each of two edges of said writing surface, means for illuminating said photocells in each of said edge arrays from light sources ostensibly positioned along diametrically opposite edges of said writing surface, means for identifying the location, in each of said arrays, of photocells that are momentarily shadowed by said writing instrument as a message is entered on said surface in terms of said visually distinctive regions of said surface, and means for utilizing said location identifications.

13. Electrographic transmitter apparatus as defined in claim 12 wherein said means for separating said writing surface into visually distinctive regions in said surface comprises a plurality of narrow windows extending in the plane of said writing surface, and means for illuminating said windows.

14. An electrographic transmitter for developing coordinate signals in terms of X and Y and Z values that together indicate the instantaneous position of a writing instrument in a writing surface and contact of said instrument with said surface that comprises, a writing surface, means for directing flat focused beams of light over said surface in two orthogonal directions designated, respectively, X and Y, a plurality of photosensitive elements positioned along the edges of said writing surface in the paths of said beams for individually generating electrical signals indicative of the degree of illumination incident thereon, means responsive to the signals generated by said photosensitive elements for indicating, respectively, an interruption of said light beams by an opaque writing element, instantaneous pairs of said signals that exceed a selected threshold level thereby indicating the X and Y coordinates of said opaque writing element, and means responsive to the proximity of said stylus to said writing surface for generating an electrical signal Z that indicates, for stylus positions within a prescribed limit of proximity to said surface, virtual contact of said writing instrument with said surface, and for stylus positions that are outside of said prescribed limit, an absence of virtual contact with said surface.

15. An electrographic transmitter as defined in claim 14, wherein said means for generating an electrical signal Z is a function of variations of pressure on said writing surface such that vibrations of said surface in excess of a prescribed limit denote contact of said stylus with said surface.

16. An electrographic transmitter as defined in claim 14, wherein said means for generating an electrical signal Z is a function of photocell response to an interruption of an established field associated with said writing surface.

17. Apparatus for generating signals proportional to the coordinates of position of a writing instrument as an operator moves it over a writing area to form alphabetic letters with relation to prescribed parallel guide lines, said guide lines being prescribed such that small letters such as *a* and *e* are relegated to the centermost area defined by said guide lines, letters with vertical extensions such as *l* and *t* are relegated to the upper two areas, and letters with lower extensions such as *g* and *y* are relegated to the lower two areas defined by said guide lines, comprising, a writing surface, means for projecting light in at least two directions in a plane parallel to said writing surface, the plane of said projected light being spaced above said writing surface by a small predetermined distance, a plurality of photocells positioned to intercept said light in each of said directions after its passage over said writing surface, means responsive to the magnitude of the potential developed by each of said photosensitive elements for registering the relative degree of illumination thereof, and means for developing from said registered data, signals proportional to the coordinates identified by those photosensitive devices whose degree of illumination is below a prescribed threshold level, and means for correlating said coordinate information with the coordinates of said guide lines.

No references cited.